United States Patent
Hardin et al.

(10) Patent No.: US 10,911,327 B2
(45) Date of Patent: Feb. 2, 2021

(54) APPARATUS AND METHODS FOR MANAGING SERVICE DELIVERY TELEMETRY

(71) Applicant: Time Warner Cable Enterprises LLC, St. Louis, MO (US)

(72) Inventors: Glen Hardin, Charlotte, NC (US); Niem Dang, New York, NY (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 172 days.

(21) Appl. No.: 16/154,488

(22) Filed: Oct. 8, 2018

(65) Prior Publication Data

US 2019/0052546 A1 Feb. 14, 2019

Related U.S. Application Data

(62) Division of application No. 13/830,517, filed on Mar. 14, 2013, now Pat. No. 10,212,049.

(51) Int. Cl.
*H04L 12/24* (2006.01)
*H04L 12/26* (2006.01)

(52) U.S. Cl.
CPC ........ *H04L 41/5019* (2013.01); *H04L 41/145* (2013.01); *H04L 41/12* (2013.01); *H04L 43/08* (2013.01)

(58) Field of Classification Search
CPC ... H04L 41/5019; H04L 41/145; H04L 43/08; H04L 41/12
USPC ........................................................ 709/224
See application file for complete search history.

(56) References Cited

U.S. PATENT DOCUMENTS

| | | |
|---|---|---|
| 6,345,038 B1 | 2/2002 | Selinger |
| 6,850,564 B1 | 2/2005 | Pejhan et al. |
| 7,391,780 B1 | 6/2008 | Stone et al. |
| 7,602,820 B2 | 10/2009 | Helms et al. |
| 7,769,882 B1 | 8/2010 | Wong et al. |
| 8,134,930 B2 | 3/2012 | Seymour et al. |

(Continued)

OTHER PUBLICATIONS

RFC 760, "Internet Protocol", Sep. 1981, retrieved from internet: URL: https://tools.ietf.org/html/rfc791 on Jan. 26, 2017, pp. 1-45.

(Continued)

*Primary Examiner* — Moustafa M Meky
*Assistant Examiner* — Elizabeth Kassa
(74) *Attorney, Agent, or Firm* — Gazdzinski & Associates, PC

(57) ABSTRACT

Apparatus and methods for managing service delivery quality levels and telemetry. In one embodiment, an entity (such as a Session Resource Manager or SRM) receives network layout data from the network. The SRM uses the layout data to generate a mapping of the network. The SRM also receives performance data related to the interconnections of the network. The performance data is then applied to the mapping such that, in one variant, an visual overlay showing network flow and/or performance analytics is created. Based on this mapping showing layout and corresponding performance, the SRM generates rules for delivery of services. The rules may detail preferred routes and service level information. The rules are the distributed to nodes along the delivery route and delivery is executed in compliance with the rules.

20 Claims, 12 Drawing Sheets

(56) References Cited

U.S. PATENT DOCUMENTS

| | | |
|---|---|---|
| 8,312,164 B2 | 11/2012 | Vass |
| 8,874,712 B2 | 10/2014 | Li et al. |
| 9,082,092 B1 | 7/2015 | Henry |
| 9,313,138 B2 | 4/2016 | Sun et al. |
| 10,171,607 B2 | 1/2019 | Hardin et al. |
| 2003/0056217 A1 | 3/2003 | Brooks |
| 2003/0163328 A1 | 8/2003 | Rambo et al. |
| 2004/0003337 A1 | 1/2004 | Cypher |
| 2005/0160311 A1 | 7/2005 | Hartwell |
| 2005/0262123 A1 | 11/2005 | Hirano |
| 2007/0271590 A1 | 11/2007 | Gulas et al. |
| 2008/0049787 A1 | 2/2008 | McNaughton et al. |
| 2008/0235746 A1 | 9/2008 | Peters et al. |
| 2009/0006900 A1 | 1/2009 | Lastras-Montano |
| 2009/0064254 A1 | 3/2009 | Henocq et al. |
| 2009/0180430 A1 | 7/2009 | Fadell |
| 2009/0217081 A1 | 8/2009 | Maharana et al. |
| 2010/0131672 A1 | 5/2010 | Karaoguz et al. |
| 2010/0214943 A1* | 8/2010 | Immendorf ............ H04W 36/30 370/252 |
| 2010/0287266 A1* | 11/2010 | Asati .................... H04L 12/4641 709/222 |
| 2010/0299552 A1 | 11/2010 | Schlack et al. |
| 2011/0072127 A1 | 3/2011 | Gerber et al. |
| 2011/0103374 A1 | 5/2011 | Lajoie et al. |
| 2011/0214059 A1* | 9/2011 | King ................... H04L 43/0882 715/735 |
| 2011/0302236 A1 | 12/2011 | Shrum, Jr. et al. |
| 2012/0084406 A1* | 4/2012 | Kumbalimutt ....... H04L 41/5054 709/220 |
| 2012/0127881 A1 | 5/2012 | Wiley et al. |
| 2012/0182864 A1 | 7/2012 | Heinz et al. |
| 2012/0236930 A1 | 9/2012 | Gavade et al. |
| 2012/0320789 A1 | 12/2012 | Wu et al. |
| 2012/0320795 A1 | 12/2012 | Shukla et al. |
| 2013/0091249 A1 | 4/2013 | McHugh et al. |
| 2013/0163430 A1 | 6/2013 | Gell et al. |
| 2013/0225122 A1* | 8/2013 | Kahn ................... H04L 12/1442 455/406 |
| 2013/0250786 A1* | 9/2013 | Balasaygun ........ H04L 41/5032 370/252 |
| 2013/0286868 A1* | 10/2013 | Oyman ................. H04W 24/08 370/252 |
| 2013/0318251 A1 | 11/2013 | Mohammad et al. |
| 2013/0332799 A1 | 12/2013 | Cho |
| 2014/0024383 A1* | 1/2014 | Rahman .................. H04L 45/22 455/445 |
| 2014/0089725 A1 | 3/2014 | Ackaret |
| 2014/0204738 A1* | 7/2014 | Carter ................... H04L 47/122 370/230 |
| 2014/0280878 A1 | 9/2014 | Hardin et al. |
| 2014/0282784 A1 | 9/2014 | Pfeffer |
| 2014/0330888 A1 | 11/2014 | Dave |
| 2015/0012956 A1 | 1/2015 | Kim et al. |
| 2015/0189535 A1 | 7/2015 | Bekiares et al. |
| 2015/0304288 A1* | 10/2015 | Balasaygun ........ H04L 63/0464 713/151 |
| 2016/0112730 A1 | 4/2016 | De |

OTHER PUBLICATIONS

TM Forum, "TM Forum IPDR Program", "https://web.archive.org/web/20110814123012/http://www.tmforum.org/ipdr/", Aug. 14, 2011, 2 pages.

* cited by examiner

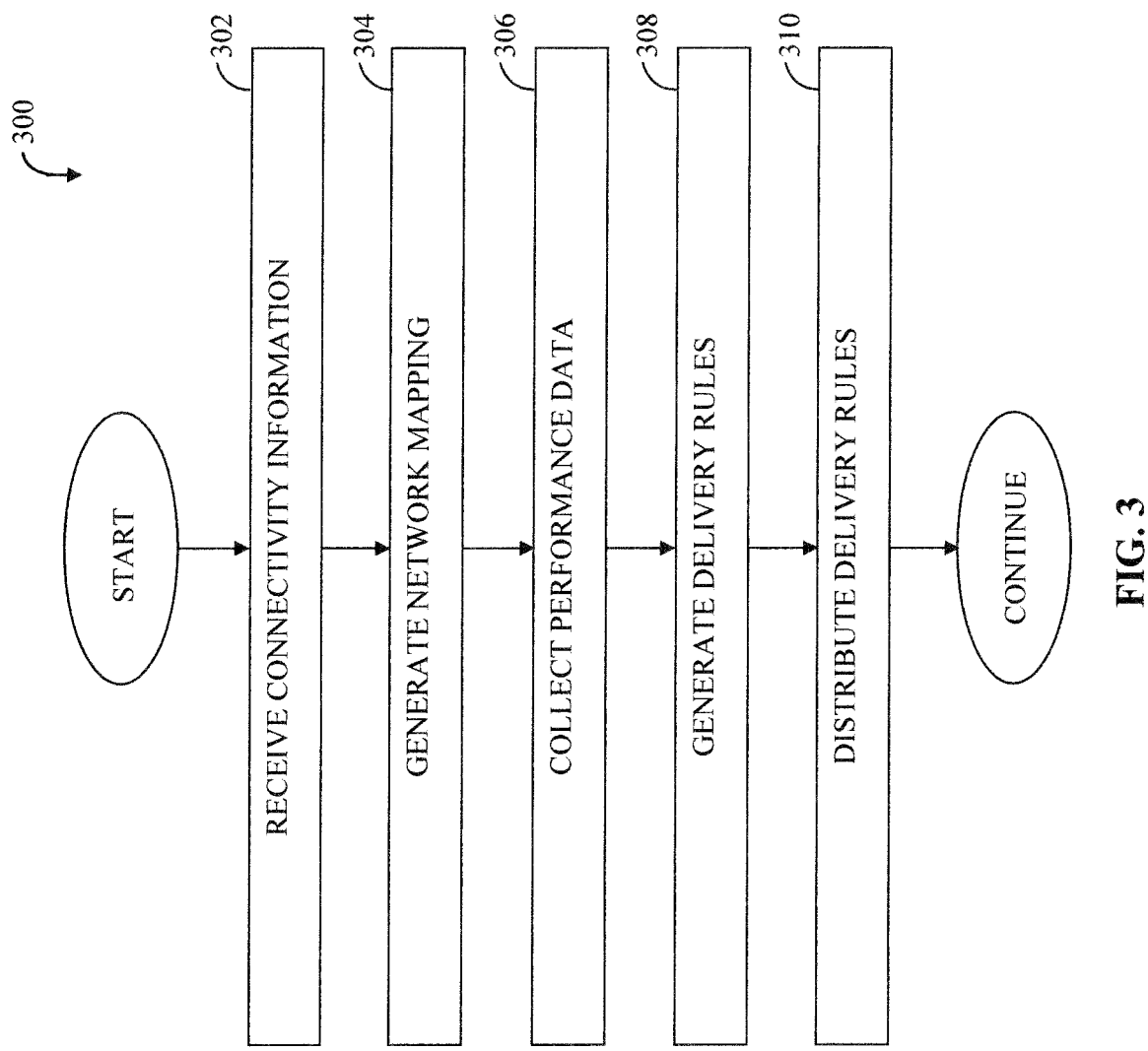

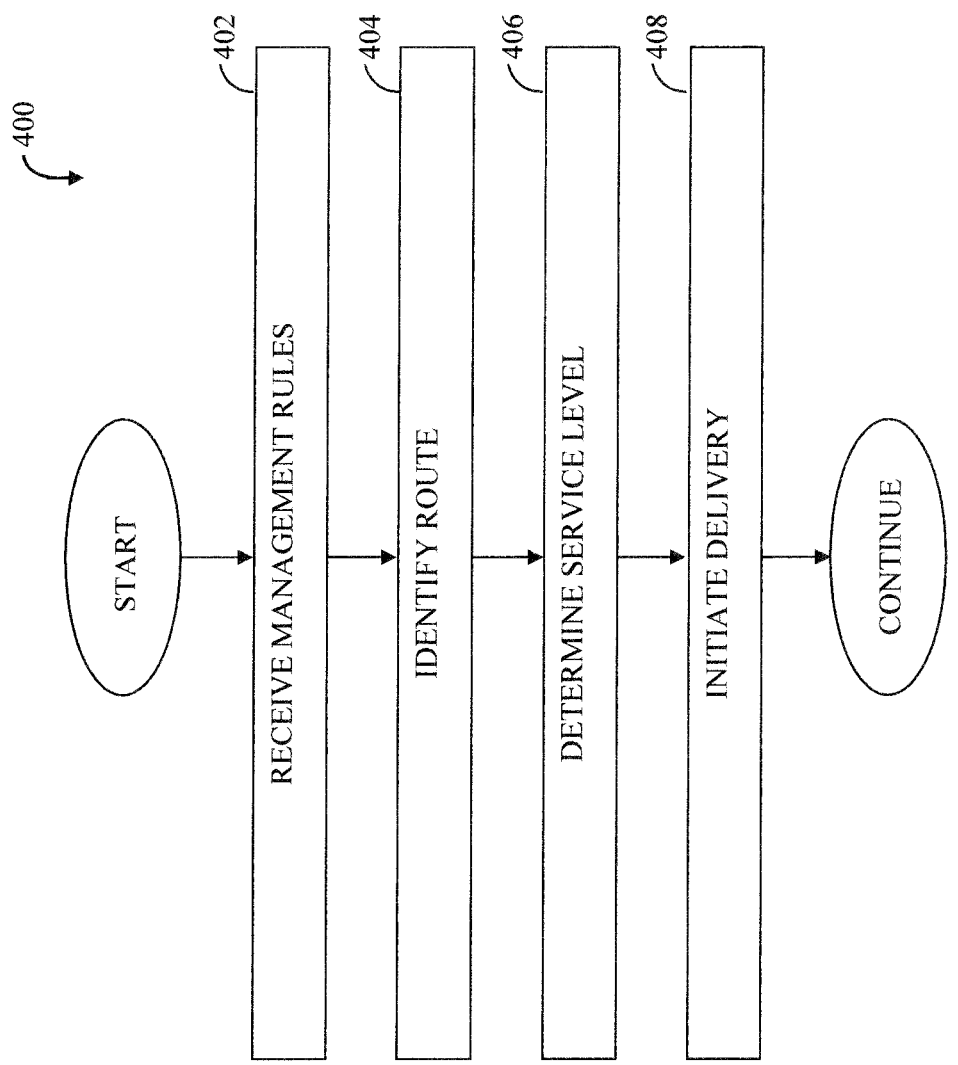

APPARATUS AND METHODS FOR MANAGING SERVICE DELIVERY TELEMETRY

PRIORITY

This application is a divisional of and claims priority to co-owned and co-pending U.S. patent application Ser. No. 13/830,517 of the same title filed Mar. 14, 2013, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content and/or data delivery over a network. More particularly, the present disclosure is related, in one exemplary aspect, to apparatus and methods for management of quality of service for managed service provision via an external network.

2. Description of Related Technology

The proliferation of the Internet and increased connection technologies such as broadband has contributed to the development of different avenues for content provision, such as for example Internet Protocol (IP) delivery. Accordingly, these new avenues have allowed for delivery of content to previously unavailable customer bases over, e.g., externally managed networks (EMNs).

These externally managed networks include, without limitation, networks of competing service providers, municipalities, enterprises, and non-profit groups such as universities. In the absence of the aforementioned avenues, provision of information services (such as television or other content services) or telecommunications services to these externally managed networks is generally limited to a single owner of the underlying physical data lines. Alternatively, these services may be provided wholesale to the externally managed network with limited service support options for network administrators.

However, the provision of services over EMNs presents challenges for service providers. For example, a service provider (e.g. multiple systems operator or "MSO") providing IP television (IPTV) service to a university is simultaneously charged with providing reliable IPTV service, while having only limited (or no) control of the "last mile" of the delivery network. Thus, the IPTV service provider may be held responsible for delivery failures or periods of limited service without options for mitigation available because of this limited control. For example, the service provider may be improperly held responsible for a buffer underrun error resulting in a loss of IPTV playback at user device. In this case, the responsible party may be the administrator of the network infrastructure of the EMN charged with last mile delivery. As such, the service provider may receive a service complaint and be unable to restore operation of the network infrastructure (or even properly diagnose the issue).

The aforementioned problem is compounded by the fact that services such as high-definition (HD) IPTV have comparatively daunting quality of service requirements. Further, denying service options to externally managed network operators based on their network's current capabilities, or forcing upgrades to such capabilities as a predicate to service, may unduly limit service opportunities.

Hence, flexible management tools for maintaining quality of service on external networks are one salient need presented by the foregoing situation. Ideally, such tools should allow for implementation of services with varying quality of service requirements and integration with a wide variety of network architectures.

SUMMARY

The present invention addresses the foregoing needs by disclosing, inter alia, apparatus and methods for management of quality of service for managed service provision.

In a first aspect of the disclosure, a method of managing service levels in a network is disclosed. In one embodiment, the method includes: (i) receiving networking data from a group of network nodes, (ii) using at least the networking data, determining the layout of the network, (iii) receiving performance information and/or connection type information for at least one node of the group of nodes, and (iv) determining one or more delivery rules for the at least one node of the group of nodes.

In one variant, the method further includes causing content delivery to the at least one node of the plurality of nodes to comply with the one or more delivery rules.

In a second aspect of the disclosure, a method of content delivery is disclosed. In one embodiment, the method includes: (i) receiving data associated with a mapping of a network, (ii) identifying a route for content delivery to a network device using the received data, (iii) receiving a connection profile associated with an infrastructure element and/or the network device, (iv) using the at least one connection profile and the route to identify a quality level for the content delivery, and (v) initiating transmission of the content in accordance with the determined quality level.

In a third aspect of the disclosure, a service management apparatus is disclosed. In one embodiment, the apparatus includes a network interface and processing logic.

In a variant, the network interface is configured to receive network layout data from a plurality of nodes of an externally managed network, and transmit one or more rules related to a service delivery level for at least one of the plurality of nodes. Further, the processing logic is configured to run one or more processes thereon. In one implementation, the one or more processes include a plurality of instructions configured to, when executed, generate a network map of the externally managed network using the received network layout data, and based at least in part on the generated network map, determine the one or more rules related to the service delivery level for the at least one of the plurality of nodes.

In a fourth aspect of the disclosure, a non-transitory computer-readable apparatus configured to store one or more computer programs thereon is disclosed. In one embodiment, the one or more computer programs include a plurality of instructions configured to, when executed: collect raw networking data from one or more network nodes, analyze the collected raw networking data to determine a network layout, analyze the collected raw networking data to associate one or more performance levels with at least one of the one or more network nodes, assign at least one delivery rule to the at least one of the one or more network nodes, and send the at least one delivery rule to a network entity associated with delivery of a service to the at least one node.

In a fifth aspect of the disclosure, a service delivery apparatus is disclosed. In one embodiment, the service delivery apparatus includes processing logic configured to, inter alia, receive and enforce service delivery rules.

In a sixth aspect of the disclosure, computerized logic is disclosed. In one embodiment, the logic is configured to implement at least one process configured to, inter alia, execute service delivery in accordance with one or more rules received from a management entity.

These and other aspects become apparent when considered in light of the disclosure provided herein.

BRIEF DESCRIPTION OF THE DRAWINGS

FIG. 3 is a logical flow diagram illustrating an exemplary embodiment of a method for service delivery management.

FIG. 4 is a logical flow diagram illustrating an exemplary embodiment of a method for service delivery in accordance with the present disclosure.

Figure 1:
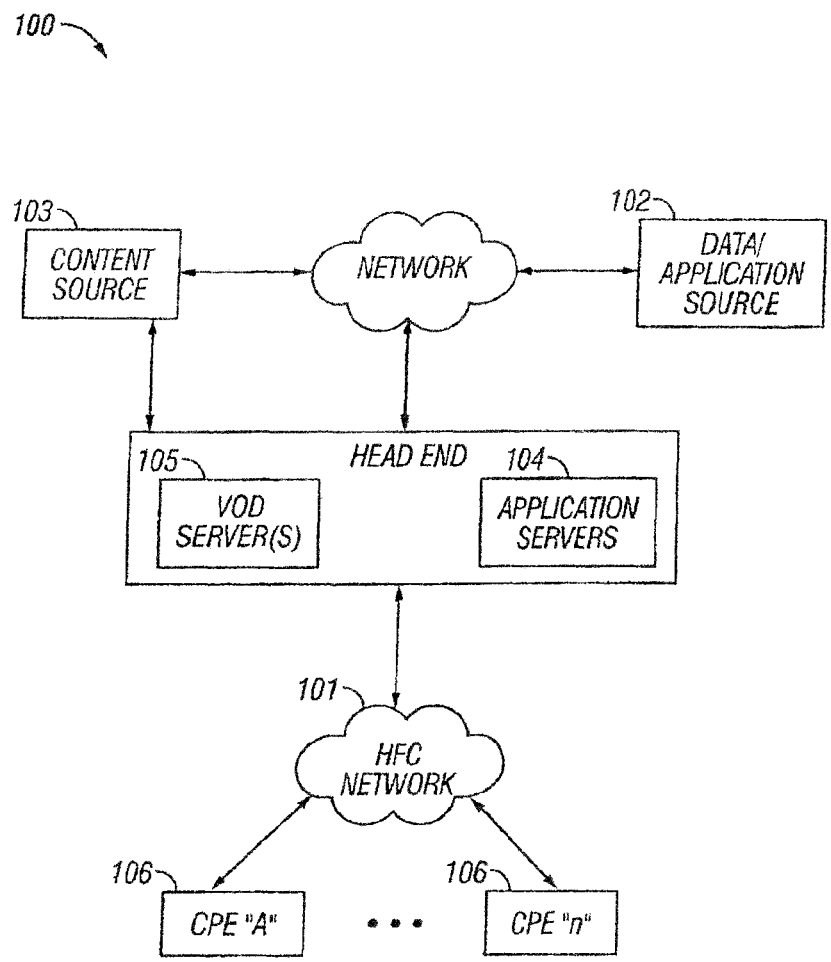
FIG. 1 is a functional block diagram illustrating an exemplary hybrid fiber network configuration useful with various aspects of the present disclosure.

All Figures © Copyright 2012-2013 Time Warner Cable, Inc. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, tablets, "phablets", PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IPTV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, OLEDs, incandescent and fluorescent devices. Display devices may also include less dynamic devices such as, for example, printers, e-ink devices, and the like.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a, b, g, n), Wi-MAX (802.16), PAN (802.15), cellular (e.g., LTE/LTE-A, 3GPP, 3GPP2, UMTS), or IrDA families.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, NFC (e.g., ISO 14443A/B), narrowband/FDMA, OFDM, PCS/DCS, LTE/LTE-A/TD-LTE, analog cellular, Zigbee, CDPD, satellite systems, millimeter wave or microwave systems, acoustic, and infrared (i.e., IrDA).

Overview

In one salient aspect, the present disclosure provides apparatus and methods for optimizing delivery telemetry via network mapping. In one embodiment, a session resource manager (SRM) or other logical entity collects information relating to network layout, and maps network performance to this layout. The SRM system uses knowledge of existing network topology to optimize telemetry preferences for devices in the network so as to monitor, adapt, and deliver stable, quality services to end users.

In an exemplary implementation, the SRM receives network layout data from the managed network. The SRM uses the layout data to generate a mapping of the network. The SRM also receives performance data related to the interconnects of the network. The performance data is then applied to the mapping such that an overlay showing network flow is created. Based on this mapping showing layout and corresponding performance, the SRM generates rules for delivery of services. The rules may for example detail preferred routes and service level information. The rules are the distributed to some or all of the nodes along the delivery route, and delivery is executed in compliance with the rules.

In addition, the SRM affords administrators a centralized location for enforcement of network policies. For example, the administrator may set guidelines for service delivery level by altering settings of the SRM rather than updating policies on every affected node. The policies are then enforced by the SRM regardless of whether such guidelines are warranted by network performance and layout.

Further, the SRM may be used to diagnose problems in the mapped network. For example, if an increased number of failures are noticed for a portion of the network, the SRM may alert an administrator of the problem area. Further, the mapping generated by the SRM may be used to create a visualization of the network, from which performance may be monitored. The visualization allows for an administrator to quickly pinpoint areas of the network with service issues and assists in diagnosis. In one implementation, a 'netmask' view may be applied to the visualization such that the operator may focus on a specific region or portion of the network.

Detailed Description of Exemplary Embodiments

Exemplary embodiments of the apparatus and methods of the present invention are now described in detail. While these exemplary embodiments are described in the context of a managed hybrid fiber coax (HFC) cable system architecture having a multiple systems operator, digital networking capability, and plurality of client devices/CPE, the general principles and advantages of the invention may be extended to other types of networks and architectures, whether broadband, narrowband, wired or wireless, terrestrial or satellite, managed or unmanaged (or combinations thereof), or otherwise, the following therefore being merely exemplary in nature.

It will also be appreciated that while described generally in the context of institutional service provision (e.g. academic, commercial, government, non-profit, etc.), the present invention may be readily adapted to other types of environments (e.g., home networks, etc.) as well. Myriad other applications are possible.

Further, although described in the context of service provision over an externally managed network, the architectures and techniques described herein may be readily applied to internal network management. The external managed network embodiments presented are merely used to demonstrate the flexibility and general applicability of the principles described herein (e.g. may be implemented with or without full administrator control of a network) and should not be considered in any way limiting.

In addition, while the disclosure refers at numerous points to one or more interne protocol television (IPTV) embodiments, the principles of the disclosure are contemplated in other applications, such as video services (e.g., network DVR, second screen apps, cloud based digital navigators, OnDemand or over-the-top (OTT) content (e.g., Netflix®, Hulu®, virtual MSO services, etc.)), visual communications (i.e., Skype®, Facetime®, etc), or cloud computing/storage/streaming services. All such embodiments are considered disclosed herein.

Also, while certain aspects are described primarily in the context of the well-known Internet Protocol (described in, inter cilia, RFC 791 and 2460), it will be appreciated that the present invention may utilize other types of protocols (and in fact bearer networks to include other internets and intranets) to implement the described functionality.

Bearer Network—

FIG. 1 illustrates a typical content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below), or others, may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
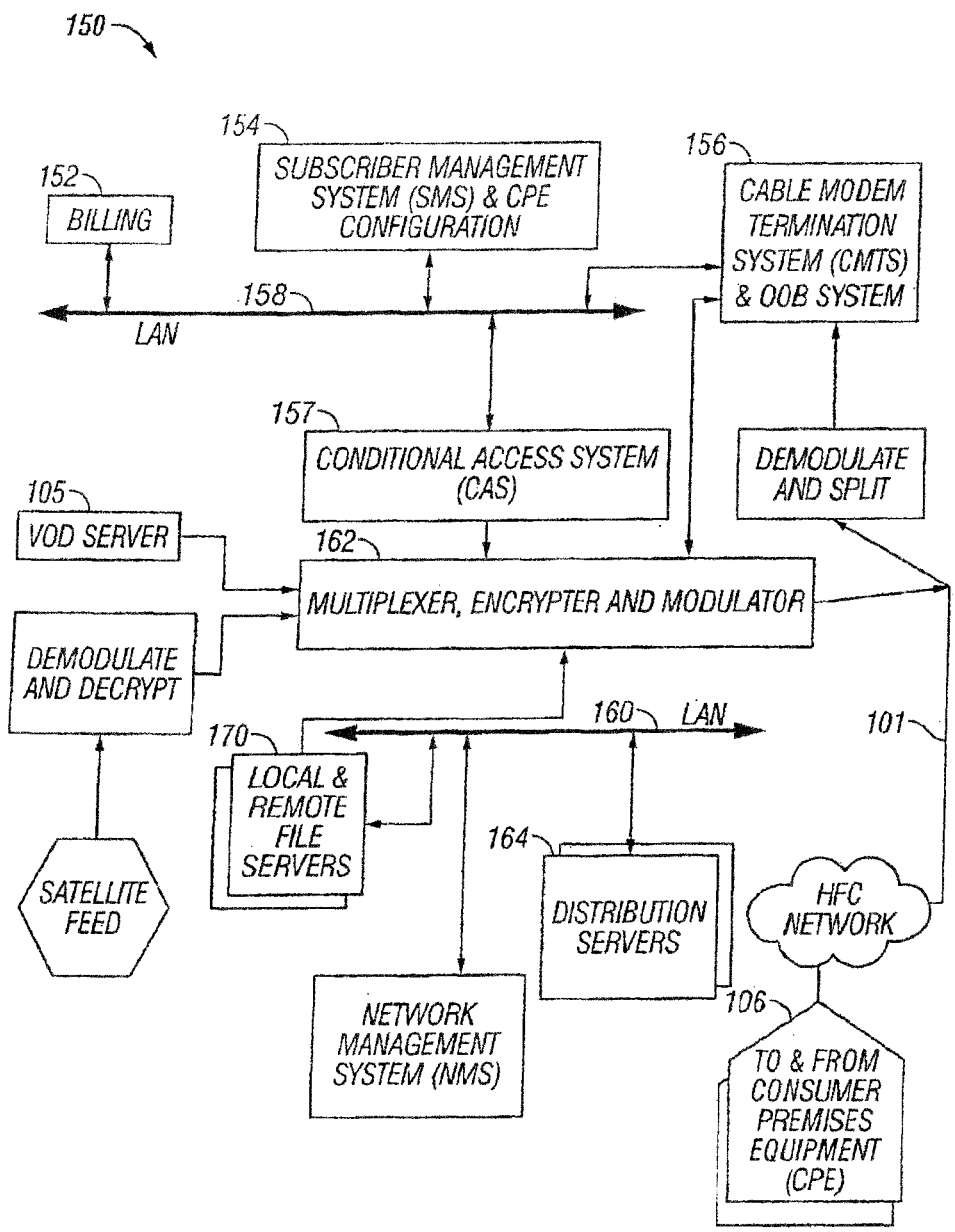
FIG. 1a is a functional block diagram illustrating one exemplary network headend configuration.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
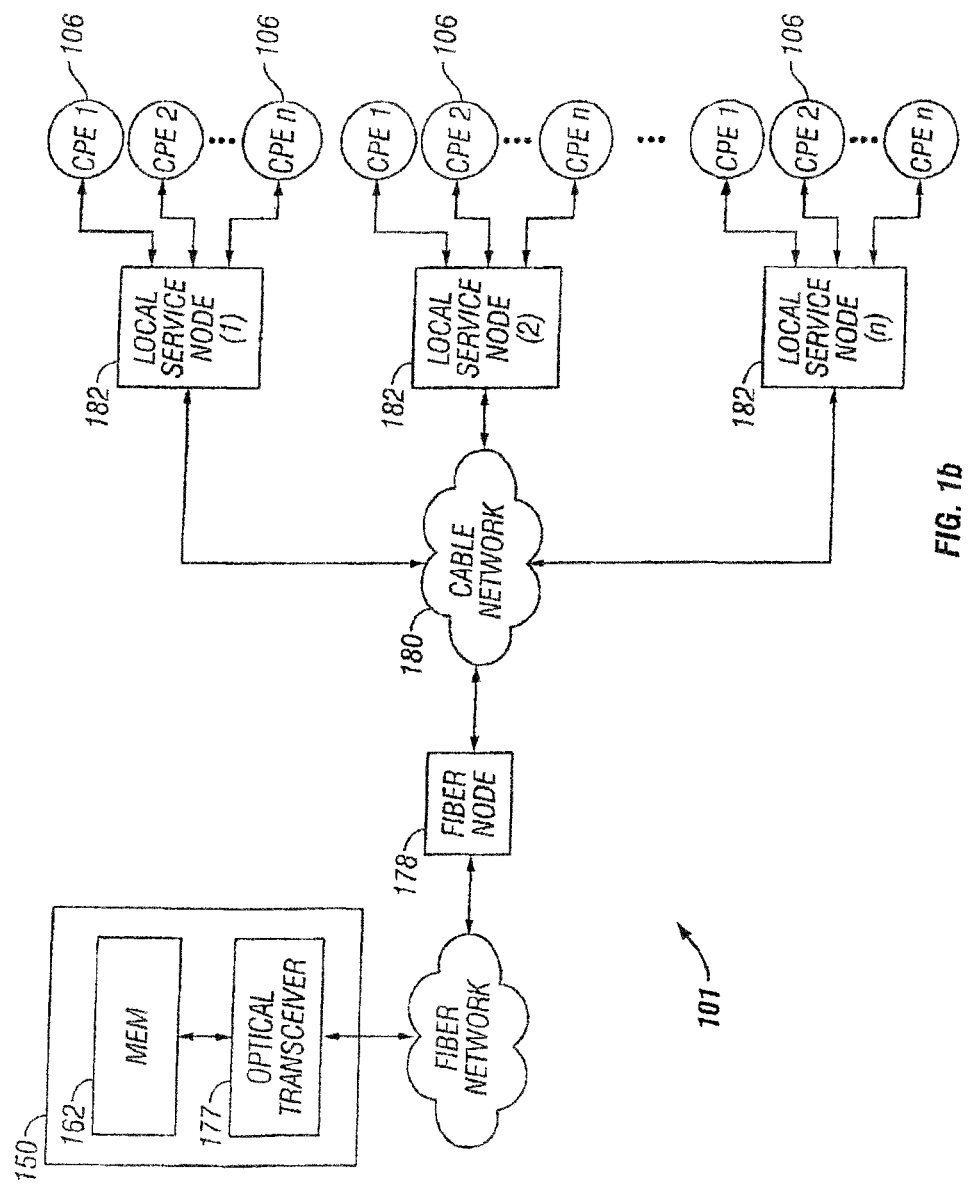
FIG. 1b is a functional block diagram illustrating one exemplary local service node configuration useful with various aspects of the present disclosure.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
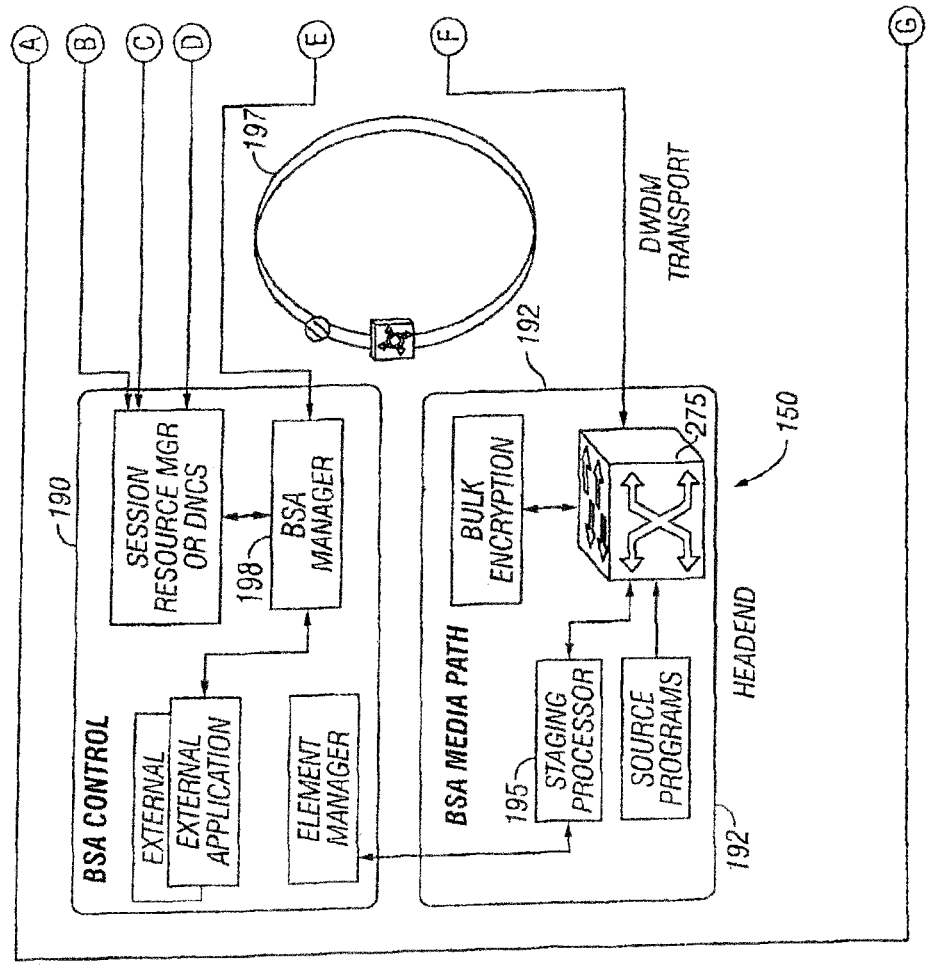
FIG. 1c is a functional block diagram illustrating one exemplary broadcast switched architecture (BSA) network.
Figure 1C:
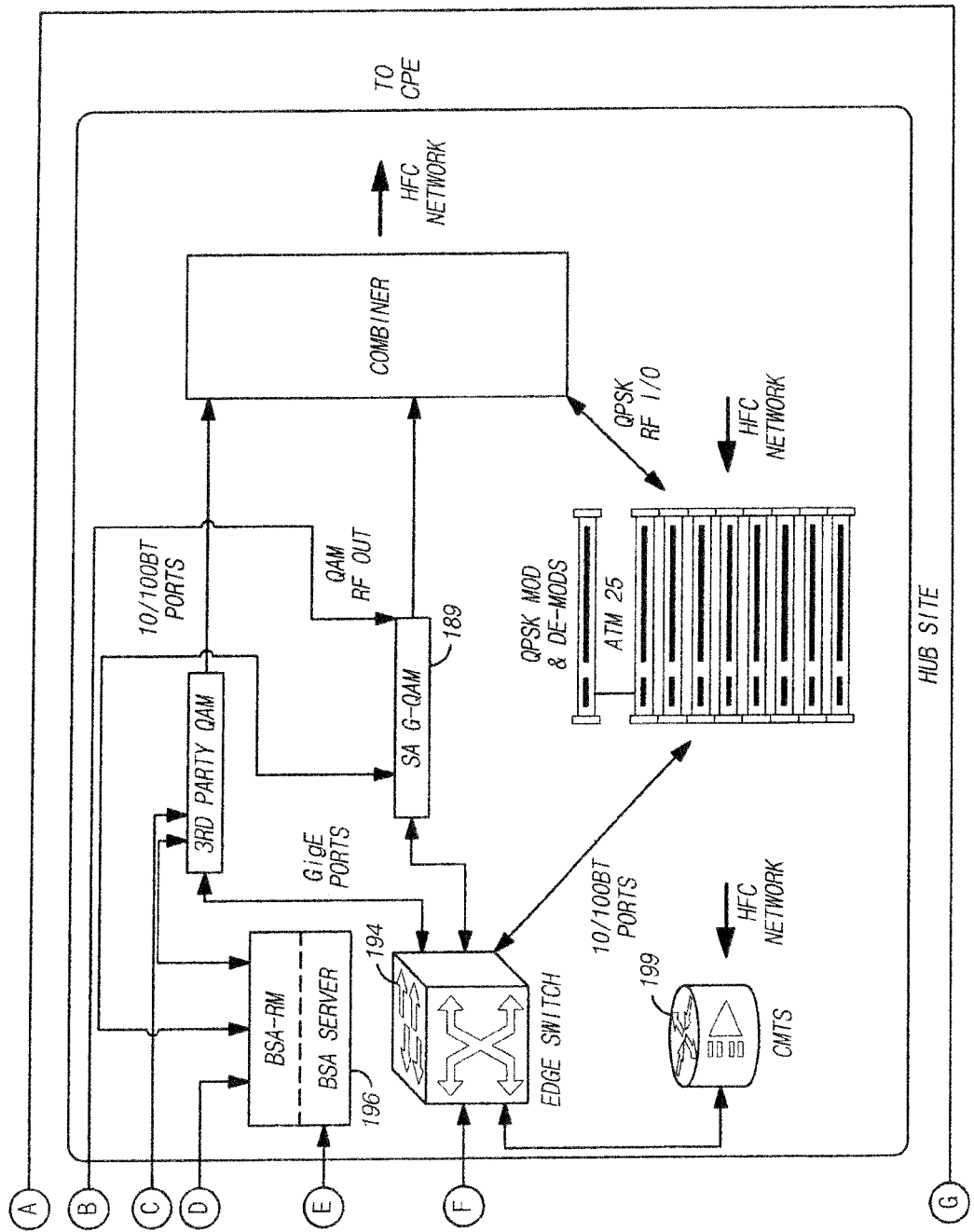

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks—

FIG. 1c illustrates an exemplary "switched" network architecture. While a so-called "broadcast switched architecture" or BSA network is illustrated in this exemplary network architecture embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. Patent Application Publication No. 2003/0056217 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
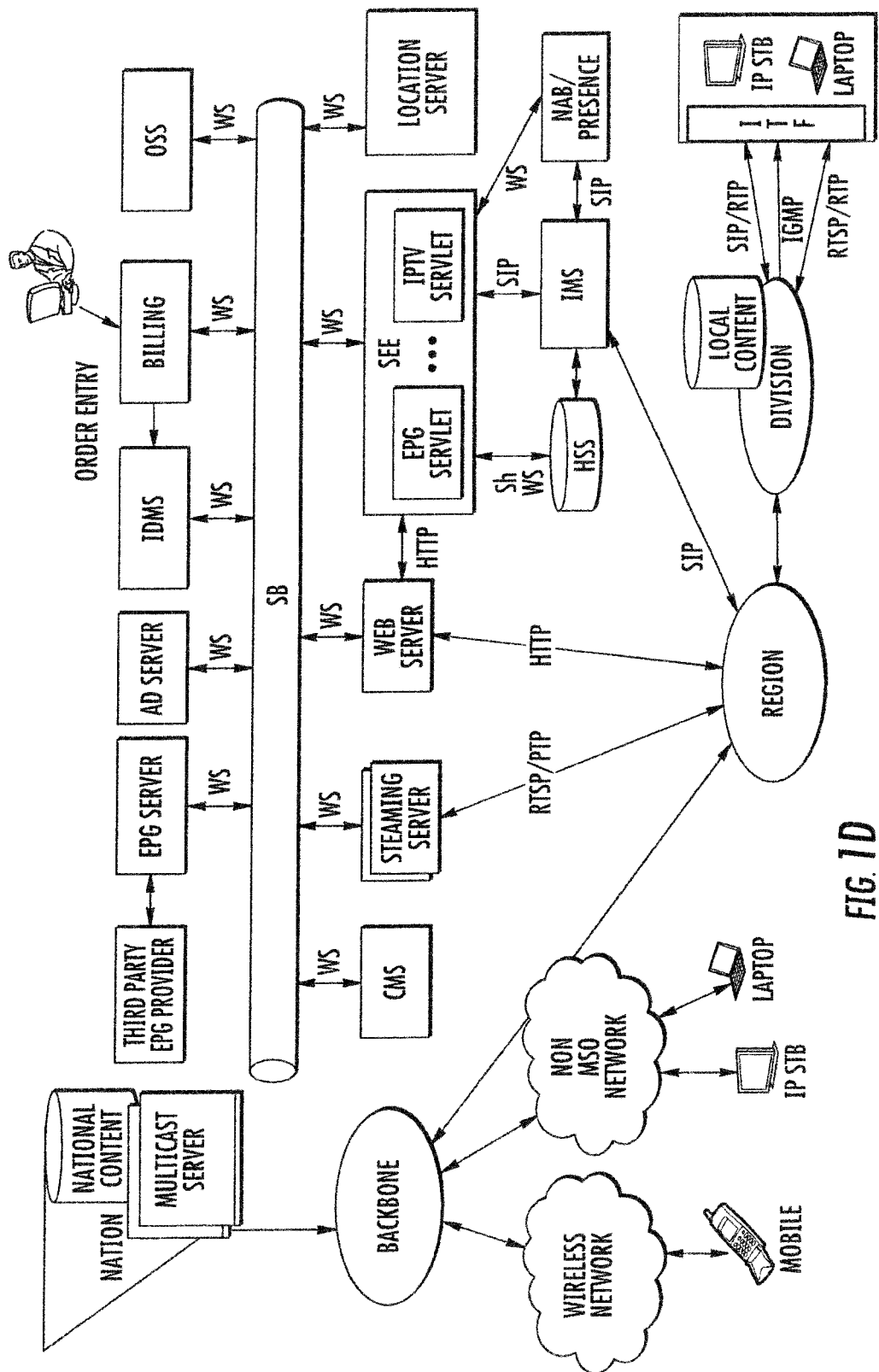
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Session Resource Management Network Architecture—

Figure 2:
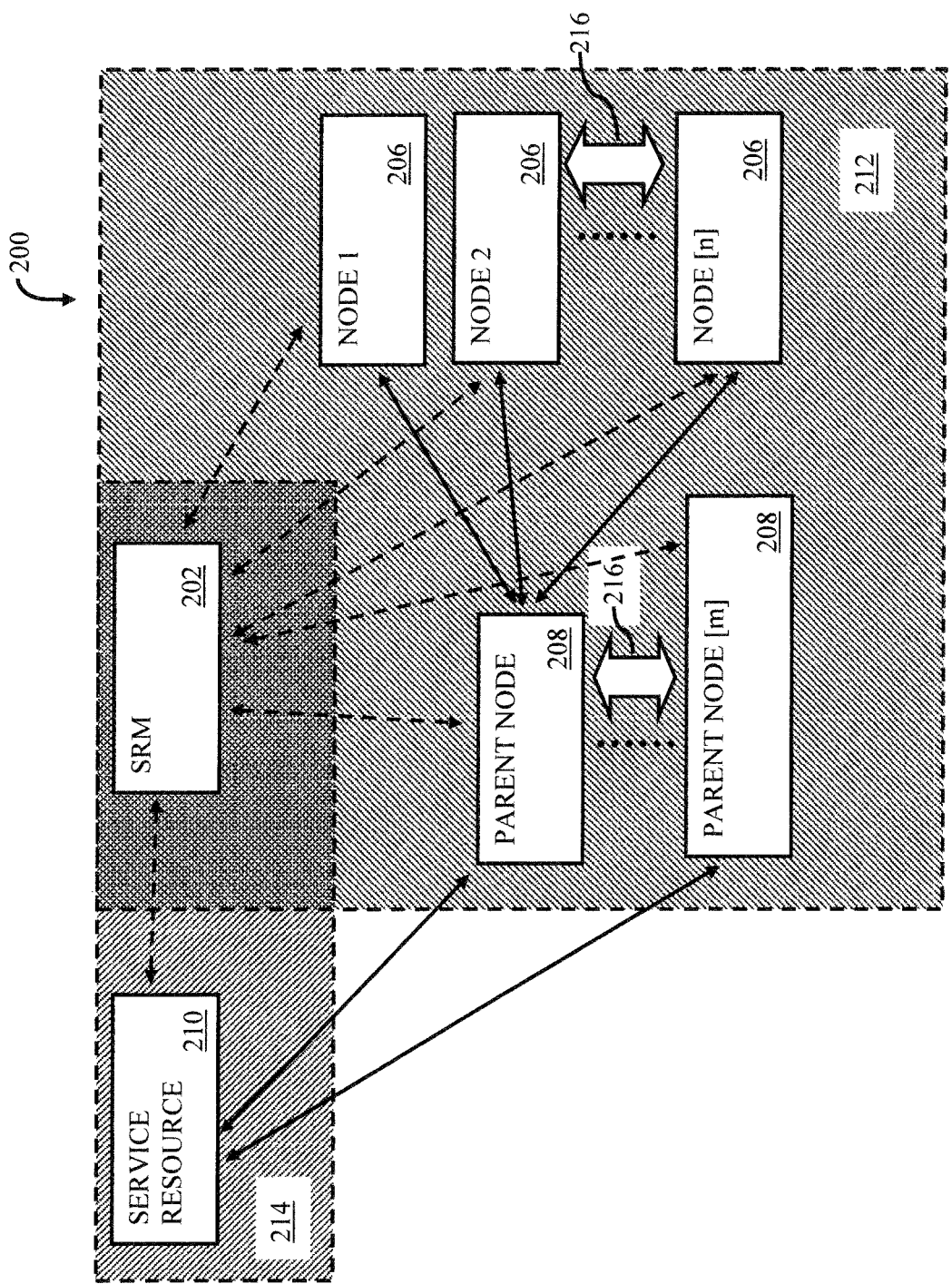
FIG. 2 is a functional block diagram illustrating an exemplary embodiment of a network architecture according to the present disclosure.

FIG. 2 is a block diagram illustrating an exemplary network architecture 200 for enabling managed service provision (including e.g., management of quality of service requirements) over an externally managed network, configured in accordance with one embodiment of the disclosure. The exemplary illustrated network entities and apparatus are configured to operate within one or more of various the above-described bearer networks of FIGS. 1-1d, although others may readily be used. The network may be based on wireless and/or wireline networking technologies (e.g. Wi-Fi family 802.11, WiMAX 802.16, wired Ethernet standards (802.3), or optical standards, etc.). It will be appreciated that bridges may be used to create a hybrid network environment using multiple ones of such technologies (e.g. wireless/wired Ethernet hybrid).

As shown, the network architecture 200 generally includes an session resource manager (SRM) entity 202 in communication with a plurality of network nodes 206, one or more parent nodes 208, and a service resource (e.g. an IPTV server, etc.). The nodes and the parent nodes are disposed within the architecture of the externally managed network (EMN) 212, and the service resource is included within the service provider network (SPN) 214. The SRM itself may be included within the EMN or SPN or distributed across both networks. The SRM may be implemented in any number of different forms, including without limitation as a "virtual" entity or process running on extant hardware within the architecture, or as a separate substantially stand-alone device (e.g., server or blade).

It will be appreciated that the parent and child nodes may be several "generations" deep. Although not shown, nodes may be "grandparent", "great grandparent" nodes, and so on. Further, in various implementations, one or more end user nodes may have a direct out-of-network connection to the service resource (i.e., lacking a parent node).

The service resource 210 provides content to the parent nodes 208 of the EMN. The parent nodes then forward the content to the nodes 206, which may comprise end user local networks of one or more devices. Depending on the implementation, the parent nodes and nodes may optionally engage in peering 216 to receive the content.

The SRM 202 gathers information on the connection characteristics of the various nodes and parent nodes of the EMN 212, and develops a "mapping" of the EMN. As used in this context, the term "mapping" refers without limitation to any structural, relational, graphical representation of network topology. For example, a mapping may include a listing of nodes and the various interconnects between the nodes. The mapping may be static or dynamic. For example, an SRM capable of dynamic mapping may have access to dynamic host configuration protocol (DHCP) information, and may be kept apprised of devices and infrastructure elements as they are added to the network.

The exemplary implementation of the mapping also includes connection performance. Initially, the performance information may comprise for instance a "best guess" based on the connection mapping and performance of nodes with similar routing to the service resource (e.g. those with similar parent nodes, nodes with similar authorized service levels, or nodes with similar numbers of available parallel route options). However, as the node develops its own "track record", the performance information may then be more clearly resolved such as by using the usage history.

In various implementations, the manager of the EMN may also/alternatively provide the SRM with mapping and/or performance information on the nodes. This information may detail, for example, types of classes for the connectivity of the nodes on the network (e.g. identifying VIP nodes with higher bandwidth allocations, or throttled nodes associated with excessive use). In some cases, this information may be used in conjunction with the above-discussed estimates and usage history to calculate the connection performance.

With the mapped relationships and performance information, the exemplary implementation of the SRM generates a connection profile for each of the nodes and parent nodes. The connection profile in one embodiment dictates the delivery characteristics of the service from the SPN. For example, in an TPTV system. the connection profile may detail the default (and/or maximum) video quality that may be delivered to a particular node. In some embodiments, the video quality may be stepped up from this default in optimal connection conditions (e.g. low traffic at a parent node), or stepped down in below-average conditions (e.g. service interruptions).

The connection profile may also include multiple entries, in various implementations. For example, in the case of peer-to-peer delivery 216, a node may have video quality options only present when content is edge positioned.

The connection profile itself may be dynamic, allowing for optimization of resource usage. Again, returning to the example of IPTV, rather than enforcing a default video quality, the system may select a video quality based in part on current conditions, and in part on the profile.

In various implementations, the SRM may be used to diagnose problems in the EMN. For example, if an increased number of failures or general under performance is detected for a group of peer nodes (i.e. those of the same parent). The SRM may infer that the corresponding parent may be malfunctioning and may alert an administrator (e.g. by displaying an alert or by sending an alert message to a terminal associated with the administrator, etc.). Alternatively, such malfunctions or underperformance may indicate improper connection profiles in the SRM's mapping. The SRM may then take appropriate action. For example, in an exemplary IPTV implementation, the SRM may reduce the video quality until such malfunctions fall below a predetermined threshold.

The SRM system allows operators to leverage knowledge of existing network topology, and strategically pre-assign optimal telemetry profiles to devices at customer premises and/or along the network to monitor, adapt, and deliver and ensure consistent quality of experience to the end users without over-burdening the EMN.

It will be appreciated that the SRM mapping solution can be abstracted as e.g., a graph-based challenge, where an operator follows the depth first approach to traverse the network topology to all possible end nodes (e.g. devices at customer premises) and determine the best possible telemetry profile for those terminating devices. Then, the operator may follow a breadth first approach to deterministically assign optimal telemetry profiles to network devices (e.g. designated network servers/routers for a serving area) using aggregate capacity analytics.

Figure 2A:
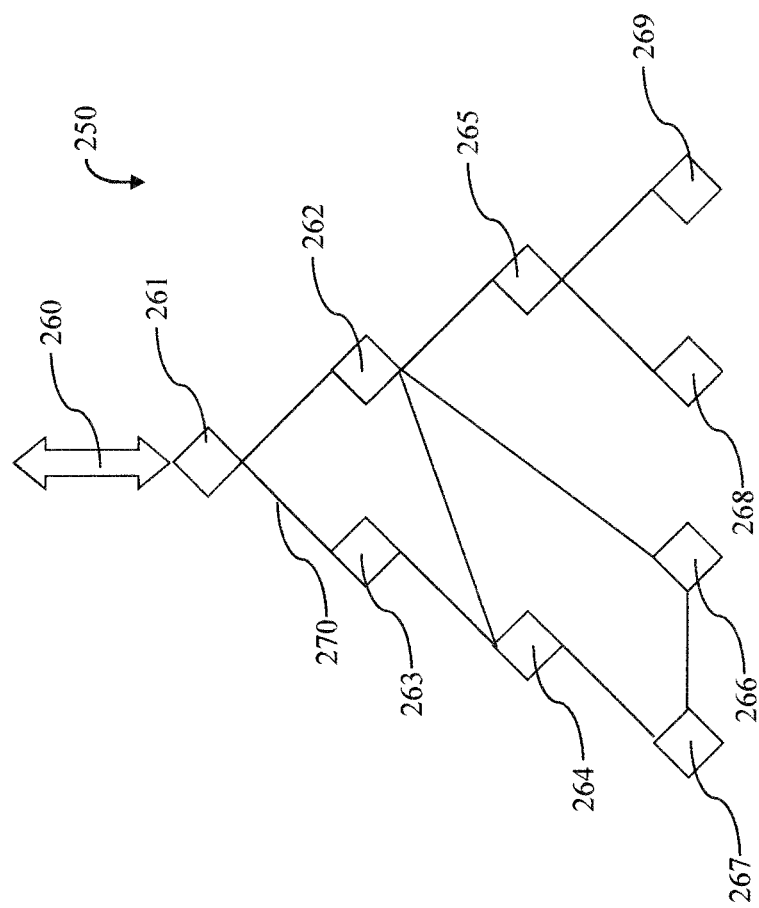
FIG. 2A is a functional block diagram illustrating an exemplary visual representation of a network mapping.

The depth first and breadth first approaches may be further explained by way of non-limiting example. Referring now to FIG. 2A, an exemplary visual representation of a network mapping is shown. The network includes on-ramp 260, nodes 261-269, and connections 270. In this example depth is defined as number of connections to on-ramp 260 for a given path, Breadth is defined the number of peer nodes with a connection to on-ramp 260 at the same depth. A depth first analysis for node 266 yields multiple possible paths to on ramp 260. These include path 261-262-266, path 261-263-264-262-266, and path 261-263-264-267-266. Thus, node 266 has one path at depth 3 and two paths at depth 5, Similarly nodes 264 and 265 each have paths at depth 3. This process may continue until all paths for each node are identified. Once the paths are identified, a breadth first approach may be used to determine bandwidth balance load. Starting with node 261, the nodes are analyzed in order according to their shortest available path. Because all possible paths have been identified, the system may evaluate each path involving a given node at a given depth in the path. For example, for the depth 2 evaluation of node 262 paths 261-262-264, 261-262-265, and 261-262-266 are analyzed for telemetry optimization. Because all paths to nodes 265, 268, and 269 include at least path 261-262-265, node 262 must have capacity equal to the aggregate of at least those three nodes. If node 266 depends on its depth 3 path (261-262-266), this further adds to the capacity requirements of node 262. Thus, a telemetry assignment may be made to prioritize use of path 261-263-264-267-266 over use of path 261-262-266 for node 266. Thus, the familial load on 262 is reduced. This breadth first process may continue until all available paths at all depths are properly prioritized. Further, the depth and/or breadth first analyses may be periodically repeated to ensure the telemetry prioritization is optimal for the current net conditions. It will be appreciated that breadth and depth are relational terms and may be defined from any point in any network. The selection of on-ramp 260 is used to illuminate the principles of each of the approaches and is not meant to be limiting in nature.

The SRM may be used, inter alia, to build a mapping to support applications that require assessment or distribution of performance characteristics versus both time and system state. For example, a service representative may used the SRM to quickly respond to a customer call for zero or degraded service using a visualization of the network mapping to pin-point the locations within the network (e.g. EMN) where services are impaired or completely broken. Further, such visualizations may be implemented with select and zoom functions such that an operation may focus on a specific portion of the network. In one implementation, a 'netmask' view may be used. In such a view, the operator may select only certain portions of the network to be included in the visualization. Alternatively, all portions may be visualized, but the selected netmasked portions may be highlighted (e.g. unblurred, enlarged, increased-contrast, special color, animated, etc.). The netmask portions may be selected by a specific network feature commonly shared by the included elements (e.g. network throughput, portion of IP-address, performance characteristics, peer-level, number of connections, number of parent/child nodes, etc.).

Methods—

Referring now to FIG. 3, a flowchart illustrating one embodiment of a generalized method 300 of service level management on an EMN is shown. At step 302 of the method 300, the SRM receives connectivity information from the EMN. The connectivity information may include e.g., data on the nodes of the EMN and their corresponding interconnections. This data may be collected passively by the SRM. For example, the SRM may monitor local network traffic (e.g. the SRM may view routing information on packets routed between nodes, similar to the operation of a packet sniffing routine). Further, the nodes themselves may send mapping data to the SRM. For example, the nodes may perform trace-route operation (or other route determining operation) on the received service to determine how it is delivered to them. In this case, the trace-route data may then be sent to the SRM. Alternatively, the information may be actively fed to the SRM by one or more processes setup via a network administrator. Combinations of the foregoing (and yet other techniques) may also be utilized consistent with the methodology 300.

At step 304, the SRM generates a mapping of the EMN. The mapping includes the various nodes of the EMN and routes between them. In various implementations, the mapping is used to make routing decisions for service delivery. For example, the SPN may select a point of entry for the EMN based on the mapping. In networks with multiple "on-ramps" to the Internet, the choice of entry point may be used to ensure the optimal route to the end destination for the service. The mapping may also be used to identify bottlenecks in the network. For example, if the network has only one on/off ramp to the Internet, that ramp may limit the number of users that may receive outside provision of differing content simultaneously.

At step 306 of the method 300, the SRM collects data related to the connection performance of the interconnects among the nodes. This data may comprise e.g., information on the connection technology between each node. Further, in some embodiments, the connection performance data may include connection transmission history. For example, throughput and latency for various activities may be monitored and recorded in the historical data. In addition, this data may also include network specific management data from the administrator of the network (e.g. data on bandwidth allowances, caps, throttling, etc.).

At step 308, the SRM generates one or more rules or other operational constraints based on the mapping of the performance data. The rules of the exemplary implementation guide delivery for how the SPN delivers content to the network, and how the nodes pass content to one another (e.g. parent nodes passing content to children, or peering, etc.).

For an exemplary IPTV embodiment, the rules may specify a video quality level to be delivered to a node. The rules may specify without limitation, options available, a default quality, or a maximum quality. Further, the rules may specify edge positioning for content. For example, some content may have varying quality or availability rules if pre-positioned on a parent node. Similarly, rules may vary for peer-to-peer connections. These rules may be particularly flexible if the pre-positioning of the content places the content past one or more bottlenecks of the EMN identified in the mapping of step 304.

In various implementations, the rules may also include tolerances for one or more performance options. In the IPTV example, this corresponds to, inter alia, a network activity level (or activity levels for parent node or single node) at which certain quality options become unavailable or quality is preemptively reduced to avoid potential service failures.

It will also be appreciated that an administrator of the EMN (which may be a human, or a supervisory process such as a computer program or other artificial intelligence) may wish to prioritize certain other traffic over that of the service offered by the SPN. This comparative deprioritization may reduce the end user experience (e.g., clarity, continuity or "smoothness" of streaming, video or audio quality, download or upload speed, etc.) of the users of the service of the SPN. Consequently, the rules of the SRM may be crafted to maximize user experience, while complying with the prioritization prerogatives of the EMN administrator.

At step 310, the SRM provides the rules to the various servers and nodes involved in delivery of the service of the SPN. The SRM maintains an updated database of rules for each of the elements. In various implementations, a network element (e.g. servers, parent nodes, nodes, etc.) involved in delivery queries the SRM for rules at the time of delivery. In other implementations, the SRM provides rule updates to the elements as they are generated. In yet other implementations rule updates may be delivered at regular intervals (e.g. once a minute, hour, day, week, etc.)

Referring now to FIG. 4, a flowchart illustrating one embodiment of a generalized method 400 of service delivery on an EMN is shown. At step 402, a node (or other element in the delivery chain) receives one or more rules from the SRM. As discussed above, the frequency and the process of rule delivery may vary with the implementation.

At step 404, from the rules, the node identifies a route over which to deliver the service. In some embodiments, the rules may allow for variance in the route based on network conditions (e.g. to route around a high-activity bottleneck or a malfunctioning node, etc.). In other embodiments, the route is fixed until an update to the rules is received from the SRM.

At step 406, the node determines a service level based on the rules and route. The service level is in the exemplary implementation selected to be compatible with the rules for each of the nodes on the delivery path. For example, an end node may receive a service level lower than the maximum it is capable of handling, if the route involves a parent node for which the rules preclude such service levels. However, the end node may receive the higher level service if the parent node is not involved in the route (e.g. in a peering connection, or other alternate path). In an exemplary IPTV embodiment, an end user node may be limited to a moderate video quality from sources outside of the EMN, but may be able to receive high quality video as long as the source is internal to the EMN.

At step 408, the node initiates delivery of the service in accordance with the determined route and service level. To accomplish delivery the node establishes any necessary links. For example in the case of peering connection, the node sets up a peer-to-peer link with the target node for service delivery. For IPTV embodiments, the node may setup one or more video streams for delivery of the video to the end node.

Exemplary SRM Apparatus—

Figure 5:
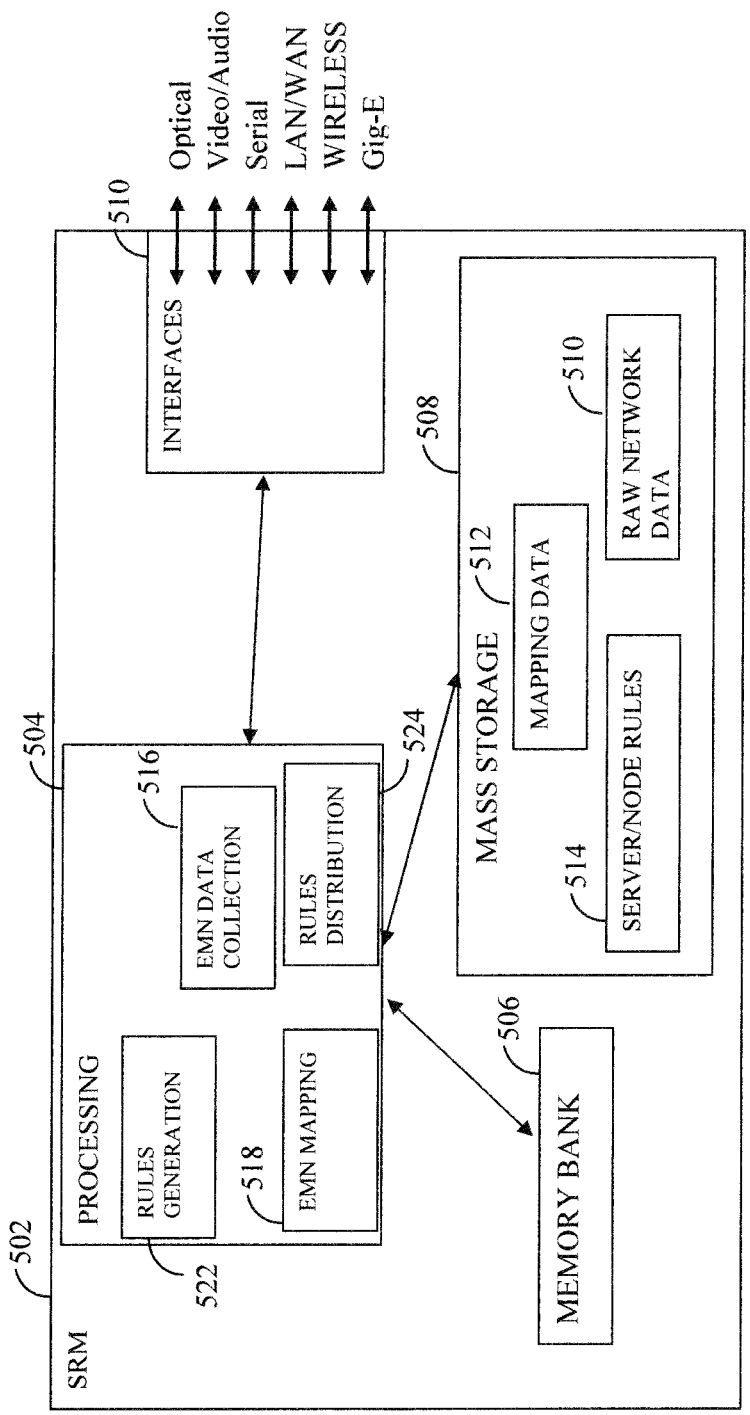
FIG. 5 is a functional block diagram illustrating an exemplary embodiment of management apparatus according to the present disclosure.

As noted above, the exemplary SRM entity 202 of the disclosure may take on any number of different forms, include a server apparatus disposed on the EMN. Referring now to FIG. 5, one exemplary SRM server apparatus 502 configuration is shown. The server apparatus in this configuration includes processing logic 504 (e.g., processor) running a number of applications, a memory bank 506 to support application execution, mass storage 508, and one or more interfaces to support connections to the EMN and various peripherals. The SRM in this embodiment is configured for implementation of the methods 300 and 400, discussed supra.

In an exemplary embodiment, the processing logic 504 and memory 506 are specifically configured to support the applications running on the processing logic. Thus, the processing logic is connected via high bandwidth channels to each of the memory, mass storage, and any incoming/outgoing interfaces.

The mass storage device is configured to store raw network data 510 collected from the EMN. The raw network data is used to generate mapping data 512, which is also stored on the mass storage device. The mapping data may be retrieved, inter alia, for generation of server or node rules for service delivery or transmission to various ones of the servers and nodes for local use thereon. The mass storage device is further configured to store the server/node rules thereon. The server node rules are in the exemplary embodiment made available for transmission to and/or reference by the various entities of the network. For example, a node on a delivery route may require rules for its target delivery node. In this case, the node on the delivery route may query the SRM, which then accesses the corresponding rule on its mass storage device. It will also be appreciated that the SRM may also access the rules on the storage device, and "push" them to the delivery node in the absence of a query.

The exemplary processing logic 504 maintains a number of applications running thereon. The EMN data collection application 516 collects raw network connection information, layout information, performance information, and/or routing information, which is stored as raw network data 510 on the mass storage device. In some variants, the SRM gathers the raw network data by querying the various nodes on the network for their networking data (e.g. routing information, historical performance data, etc.). In other variants, the raw network data may be provided by a network administrator or other entity tasked with collection and dissemination of this data. It will be appreciated that such network administrator or other entity may be configured such that, at least in certain circumstances, it may not provide exact or empirical values for the raw data, but rather may provide estimates, projections, or other types of "derivative" or speculative data. Alternatively, the administrator may provide raw data based on network policies (rather than network capability-limited values), and/or estimates based on historical performance. In yet another variant, the data from the various nodes may be "pushed" to the SRM in the absence of a query therefrom, such as according to a periodic schedule, occurrence of an event (e.g., when sufficient bandwidth exists, when a change in network configuration occurs, etc.).

In the exemplary implementation, the raw network data 510 is organized into the mapping data 512 by the EMN mapping application 518. The raw network data may be used by the EMN mapping application to piece together that layout of the network, and to determine reasonable performance estimates for the various nodes on the network (depending on the service in question and the route used). The mapping data may also be available as a visualization. The visualization may be generated by the SRM or the mapping data 512 may be transmitted to another system for display as a visualization. As discussed above, such visualizations may be used to, inter alia, assist in the diagnoses of network issues/failures.

The mapping data 512 is then used by the rules generation application 522 to generate rules for service delivery. In various embodiments, the rules a generated to offer the optimal telemetry layout of the service delivered. In an exemplary implementation, the mapping data may be used to provide a historical mapping of traffic patterns related to the delivered services (and general network traffic). Thus, administrators (e.g. the EMN administrator or a service provider representative) may apply general traffic management polices at the SRM level while taking advantage of the information available at the SRM. The policies are then also considered in rule generation.

The rules distribution application 524 running on the processing logic 504 then distributes the rules to the nodes of the EMN and any servers involved in service delivery. As discussed with respect to the exemplary method 400 above, the timing of the delivery is dependent upon the implementation. Thus, the rules distribution engine may be configured to deliver the rules, without limitation, periodically, upon request, as generated, and/or in response to a service request.

The exemplary interface 512 comprises any number of high-speed data connections to facilitate the inclusion of the SRM server in the network and the execution of the SRM's activities. The connections must supply bandwidth sufficient to support the incoming raw data, service requests, and outgoing rules, and include any of the interfaces necessary to support any of the network architectures discussed above. Such connections or interfaces may include for instance Gigabit Ethernet/10G, 1EEE-1394, Thunderbolt™, optical networking, and/or other well known networking technologies. Further, the interfaces may allow connection a display for a presentation of a visualization of the EMN mapping.

In other variants, the SRM server may be implemented one or more software routines on a network server providing other functions on the EMN.

It will also be appreciated that the functions of the SRM may be distributed over multiple network entities including, without limitation, one or more of the nodes discussed herein.

In yet other implementations, the SRM may be disposed off of the EMN (e.g. on an Internet connected server, or an entity on the SPN (headend, etc.), or a cloud computing entity). In one variant, one or more routines running the nodes of the EMN forward raw data from the EMN to the remote SRM. In others variants, the SRM receives the raw data from the EMN from a single source, such as an administration node.

It will also be appreciated that in some embodiments, the SRM may be partially disposed on the EMN and partially disposed on other networks (e.g. on an Internet server, or on the SPN, etc.). For example, the EMN data collection application may run on a node within the EMN, and the application may pass the raw data to a server on the SPN running the EMN mapping application, the rules generation application, and the rules distribution application.

Exemplary Operation—

Figure 6:
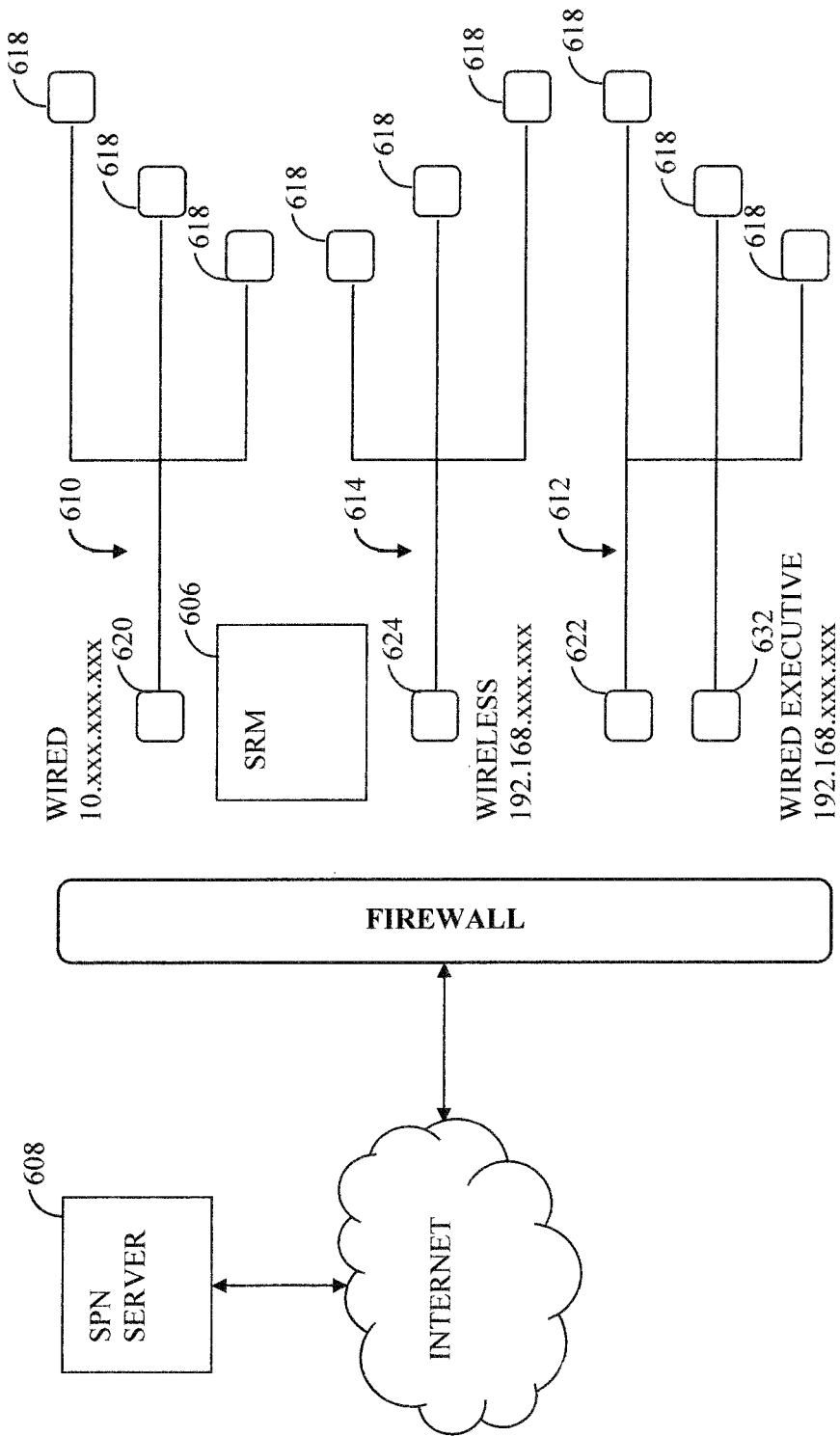
FIG. 6 is a functional block diagram depicting an exemplary visualization of an exemplary network layout.

Referring now to FIG. 6, an exemplary embodiment of a visualization of a network mapping is shown. In this mapping, the EMN 602 (behind the firewall 604) is divided into three subnets (610, 612, 614) each with parent nodes (620, 622, 632, and 624) and end user nodes (618) all managed by an internet protocol SRM (IP-SRM) 606. The EMN utilizes its own IP address space beyond the firewall.

The administrator of the network has specific polices for each of the two wired subnets (610 and 612). The third subnet 614 (wireless) has no associated policy limitations; thus, rules may be made freely via the IP-SRM to optimize service delivery from the SPN server 608 to avoid service failures (e.g., total video loss). In this case, the service in question is an IPTV delivery system.

The first wired subnet 610 is denoted with a subnet mask of e.g., 10.xxx.xxx.xxx. This subnet comprises the general use wired subnet of the institution. The EMN administrator has setup a specific policy that the maximum video bitrate for the wired subnet 610 is 3.5 Mbit/s regardless of system performance. All video delivered to the wired subnet 610 must pass though parent node 620.

The second wired subnet 612 is denoted with an exemplary subnet mask of 172.168.xxx.xxx. This subnet is the executive wired subnet. The EMN administrator policy designates a default video bitrate of 8 Mbit/s for this subnet. Further, the administrator has issued a directive that a performance related video downgrade below 5 Mbit/s for a user of this subnet should be treated as a service failure (i.e., a service alert should be generated, problem node(s) should be identified, service reroutes should be performed). However, if rerouting cannot solve the issue, video at a lower bitrate is still to be delivered if possible to avoid actual service failure. All video delivered to the executive subnet 612 must pass through parent node 622 or parent node 632.

The wireless subnet 614 is denoted with a subnet mask of 192.168.xxx.xxx. No policy limits are placed on the wireless network. All video delivered must pass through parent node 624.

Parent nodes 620, 622, 632, and 624 each have multiple high-throughput external connections to the internet.

Initially, 100 users utilize the IPTV service on the wireless subnet 614, in this case, requiring 15 unique streams (peering accounts for all others); system delivers video at 8 Mbit/s. Roughly 5,000 users utilize the service on the wired subnet 610; 450 unique streams are delivered at 3.5 Mbit/s (i.e. bitrate limited by the IP-SRM). Usage for the wired subnet 610 remains steady. For the executive network 612, current usage levels are at 1,100 users representing 120 unique streams all delivered at 8 Mbit/s.

At primetime (a high-usage period sometime later), wireless subnet usage grows to 1,000 users requesting 90 unique streams, the IP-SRM 606 reduces the video quality of 82 of the 90 streams to 750 Kbit/s; the remaining eight streams are delivered at 3.5 Mbit/s. The eight higher-bandwidth streams represent those that account for the greatest proportion of the peering (eight streams serving ~600 users via peering). The wired subnet 610 usage grows to 10,000 users and 670 streams; however delivery remains steady at 3.5 Mbit/s. Usage of the executive subnet 612 remains steady, but parent node 632 is overwhelmed with prioritized above that of the IPTV traffic, and the IP-SRM reduces the delivery quality to 3.5 Mbit/s temporarily for 400 users of the executive network. The IP-SRM reroutes their corresponding streams through the parent node 622 and restores their video bitrate to 8 Mbit/s. The IP-SRM generates a report for this SPN operator and the EMN administrator identifying parent node 632 as having an acute performance issue.

It will be recognized that while certain aspects are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the techniques and architectures disclosed herein. This description is in no way meant to be limiting, but rather should be taken as illustrative of the general principles of the disclosure. The scope of the invention should be determined with reference to the claims.

What is claimed is:

1. A computerized method of managing service levels on a digital data network, the computerized method comprising:
   receiving, at a computerized centralized resource management entity of the digital data network, networking data associated with a plurality of network nodes of the digital data network;
   based at least in part on the networking data, determining a layout of the digital data network, the layout of the digital data network comprising at least a first subnet and a second subnet;
   receiving, at the computerized centralized resource management entity, performance data for at least a first node and a second node of the plurality of network nodes, the first node belonging to the first subnet and the second node of the plurality of nodes belonging to the second subnet;
   determining, based at least in part on the layout and the performance data, one or more delivery rules for the first node;
   causing, via at least the computerized centralized resource management entity, delivery of digitally rendered content to the first node of the first subnet, the delivery in compliance with the one or more delivery rules;
   receiving, at the computerized centralized resource management entity and from a computerized process of the digital data network, data indicative of one or more policies; and
   enforcing, via at least the computerized centralized resource management entity, at least one of the one or more policies at the second node, the at least one of the one or more policies specifying a maximum video bitrate for the second node regardless of the performance data.

2. The computerized method of claim 1, further comprising optimizing, using at least the computerized centralized resource management entity and a service provider network (SPN) server, service delivery within the first subnet, the first subnet comprising a wireless subnet with no policy limitations; and
   wherein the receiving of the data indicative of the one or more policies from the computerized process of the digital data network obviates a need for the computerized process of the digital data network to update policies at the second node based on one or more settings altered by the computerized centralized resource management entity.

3. The computerized method of claim 1, wherein the causing of the delivery of the digitally rendered content in compliance with the one or more delivery rules comprises (i) reducing a bitrate quality of a first portion of a plurality of data streams in the first subnet during a prescribed period of time, and (ii) maintaining the bitrate quality of a second remaining portion of the plurality of data streams, the second remaining portion of the plurality of data streams utilizing a plurality of peer-to-peer connections thereby serving a greater proportion of user devices relative to the first portion of the plurality of data streams.

4. The computerized method of claim 1, further comprising:
   utilizing the determined layout of the digital data network to generate a visualization of the digital data network; and
   selecting a portion of the digital data network represented on the visualization, the selecting (i) based at least on a peer-level associated with the portion of the digital data network and (ii) enabling identification of one or more locations of the digital data network that are impaired.

5. The computerized method of claim 1, further comprising:
   utilizing the determined layout of the digital data network to generate a visualization of the digital data network; and
   selecting a portion of the digital data network represented on the visualization, the selecting based at least on one or more performance analytic data elements, the one or more performance analytic data elements comprising an indication of total data throughput for at least one node of the plurality of network nodes.

6. The computerized method of claim 1, further comprising:
receiving, at the computerized centralized resource management entity, performance data for a third node of the plurality of network nodes, the third node belonging to a third subnet of the digital data network;
based at least on the received performance data for the third node, identifying one or more transmission issues at the third node; and
varying, based at least on the identifying, at least a portion of a data delivery route for the third subnet.

7. The computerized method of claim 1, wherein the digital data network comprises an externally managed network associated with one or more of: (i) a university, (ii) a commercial enterprise, or (iii) a government entity.

8. The computerized method of claim 1, further comprising:
determining, based at least in part on the layout of the digital data network, a plurality of respective telemetry profiles for the plurality of network nodes; and
pre-assigning the plurality of respective telemetry profiles to one or more of the plurality of network nodes using aggregate capacity analytics; and
wherein the plurality of respective pre-assigned telemetry profiles are configured to designate prioritized routing for served areas corresponding to the one or more of the plurality of network nodes.

9. Computerized network apparatus for management of service levels on a digital data network, the computerized network apparatus comprising:
digital processor apparatus; and
storage apparatus in data communication with the digital processor apparatus, the storage apparatus comprising at least one computer program configured to, when executed on the digital processor apparatus, cause the computerized network apparatus to:
receive first data relating to a plurality of network nodes of the digital data network;
based at least in part on the received first data, generate a mapping of the digital data network, the mapping of the digital data network indicating at least a first subnet and a second subnet;
receive second data relating to data service performance for at least a first node and a second node of the plurality of network nodes, the first node belonging to the first subnet and the second node belonging to the second subnet;
determine, based at least in part on the mapping and the second data, one or more data delivery rules for the first node;
cause delivery of digitally rendered content to the first node of the first subnet, the delivery based at least on the one or more data delivery rules;
receive, from a computerized process of the digital data network, third data indicative of one or more policies; and
determine a maximum video bitrate for the second node, the maximum video bitrate (i) based at least on at least one of the one or more policies and (ii) configured to be enforced at the second node regardless of the second data.

10. The computerized network apparatus of claim 9, wherein the at least one computer program is further configured to, when executed on the digital processor apparatus, cause the computerized network apparatus to:
maintain a database of the one or more data delivery rules;
receive, from a network element of the digital data network, data representative of a query for the one or more data delivery rules, the network element associated with the delivery of the digitally rendered content to the first node; and
provide data indicative of the one or more data delivery rules to the network element.

11. The computerized network apparatus of claim 9, wherein the maximum video bitrate comprises a pre-determined bitrate of an Internet Protocol-based television service, the pre-determined bitrate set by a computerized management entity of the digital data network and irrespective of the data service performance.

12. The computerized network apparatus of claim 9, wherein the at least one computer program is further configured to, when executed on the digital processor apparatus, cause the computerized network apparatus to:
generate a visualization of the digital data network, the generation of the visualization comprising enablement of selecting and zooming functions, the generated visualization configured to display one or more specific portions of the mapping of the digital data network, the selecting and the zooming functions enabling identification of one or more impairments associated with the one or more specific portions of the mapping.

13. The computerized network apparatus of claim 9, wherein the at least one computer program is further configured to, when executed on the digital processor apparatus, cause the computerized network apparatus to:
receive fourth data related to at least one connection profile associated the first node, the at least one connection profile comprising data relating to a default video quality for the delivery of the digitally rendered content to the first node.

14. The computerized network apparatus of claim 9, wherein the at least one computer program is further configured to, when executed on the digital processor apparatus, cause the computerized network apparatus to:
based at least on the mapping, identify at least one portion of the digital data network as experiencing a reduced throughput relative to other portions of the digital data network; and
store the digitally rendered content at a prescribed location in the digital data network that is more downstream than the at least one portion of the digital data network, the storage at the prescribed location configured to enable changes to the one or more delivery rules.

15. Computer readable apparatus comprising a non-transitory storage medium, the non-transitory storage medium comprising at least one computer program having a plurality of instructions, the plurality of instructions configured to, when executed on a processing apparatus, cause a computerized network apparatus to:
receive networking data associated with a plurality of network nodes of a digital data network;
based at least in part on the networking data, identify a layout of at least a portion of the digital data network, the layout of the at least portion of the digital data network comprising at least a first subnet and a second subnet;
receive performance data for at least a first node and a second node of the plurality of network nodes, the first node belonging to the first subnet and the second node belonging to the second subnet;
determine, based at least in part on the layout and the performance data, one or more delivery rules for the first node;

cause delivery of digitally rendered content to the first node of the first subnet, the delivery based at least on the one or more delivery rules;

receive, from a computerized process of the digital data network, data indicative of one or more policies; and transmit data relating to at least one of the one or more policies to the second node, the at least one of the one or more policies (i) specifying a maximum video bitrate and (ii) configured to be enforced at the second node regardless of the performance data.

16. The computer readable apparatus of claim 15, wherein the one or more delivery rules comprise at least one delivery rule configured to (i) cause a reduction in a video quality level for one or more of a plurality of data streams in the digital data network during at least a prescribed period of time, and (ii) maintain an extant video quality level for other ones of the plurality of data streams; and wherein the other ones of the plurality of data streams serve a greater number of user devices in the digital data network relative to the one or more of the plurality of data streams.

17. The computer readable apparatus of claim 15, wherein individual nodes belonging to the first subnet each utilize a common content source, the common content source comprising at least one Uniform Resource Locator (URL) identified by the computerized network apparatus.

18. The computer readable apparatus of claim 17, wherein another individual nodes belonging to the second subnet each utilize a second common content source, the second common content source different than the first common content source of the individual nodes of the first subnet.

19. The computer readable apparatus of claim 15, wherein the plurality of instructions are further configured to, when executed on the processing apparatus, cause the computerized network apparatus to:

identify a congestion level that is associated with a plurality of peer nodes of at least one of the first subnet or the second subnet, the plurality of peer nodes sharing a common parent node, the congestion level being higher than another congestion level associated with other nodes of the digital data network; and based at least on the identification of the congestion level, transmit data relating to a notification of the congestion level to a terminal associated with an administrator of the digital data network.

20. The computer readable apparatus of claim 19, wherein the plurality of instructions are further configured to, when executed on the processing apparatus, cause the computerized network apparatus to reduce a video quality level for digital content delivery to at least one of the plurality of peer nodes until the congestion level falls below a prescribed threshold, the video quality level comprising a bitrate associated with the digital content delivery.

* * * * *

UNITED STATES PATENT AND TRADEMARK OFFICE
CERTIFICATE OF CORRECTION

PATENT NO. : 10,911,327 B2  
APPLICATION NO. : 16/154488  
DATED : February 2, 2021  
INVENTOR(S) : Glen Hardin et al.

Page 1 of 2

It is certified that error appears in the above-identified patent and that said Letters Patent is hereby corrected as shown below:

In the Claims

Currently Reads (Columns 17-18, Claim 1):
"1. A computerized method of managing service levels on a digital data network, the computerized method comprising:
receiving, at a computerized centralized resource management entity of the digital data network, networking data associated with a plurality of network nodes of the digital data network;
based at least in part on the networking data, determining a layout of the digital data network, the layout of the digital data network comprising at least a first subnet and a second subnet;
receiving, at the computerized centralized resource management entity, performance data for at least a first node and a second node of the plurality of network nodes, the first node belonging to the first subnet and the second node of the plurality of nodes belonging to the second subnet;
determining, based at least in part on the layout and the performance data, one or more delivery rules for the first node;
causing, via at least the computerized centralized resource management entity, delivery of digitally rendered content to the first node of the first subnet, the delivery in compliance with the one or more delivery rules;
receiving, at the computerized centralized resource management entity and from a computerized process of the digital data network, data indicative of one or more policies; and
enforcing, via at least the computerized centralized resource management entity, at least one of the one or more policies at the second node, the at least one of the one or more policies specifying a maximum video bitrate for the second node regardless of the performance data."

Should Read:
--1. A computerized method of managing service levels on a digital data network, the computerized method comprising:
receiving, at a computerized centralized resource management entity of the digital data network, networking data associated with a plurality of network nodes of the digital data network;
based at least in part on the networking data, determining a layout of the digital data network, the layout of the digital data network comprising at least a first subnet and a second subnet;

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office* receiving, at the computerized centralized resource management entity, performance data for at least a first node and a second node of the plurality of network nodes, the first node belonging to the first subnet and the second node belonging to the second subnet;

determining, based at least in part on the layout and the performance data, one or more delivery rules for the first node;

causing, via at least the computerized centralized resource management entity, delivery of digitally rendered content to the first node of the first subnet, the delivery in compliance with the one or more delivery rules;

receiving, at the computerized centralized resource management entity and from a computerized process of the digital data network, data indicative of one or more policies; and enforcing, via at least the computerized centralized resource management entity, at least one of the one or more policies at the second node, the at least one of the one or more policies specifying a maximum video bitrate for the second node regardless of the performance data.--